Oct. 2, 1956 L. E. JOHNSON 2,764,966
STARTING SYSTEM FOR COMPRESSION IGNITION ENGINES
Filed Dec. 9, 1953
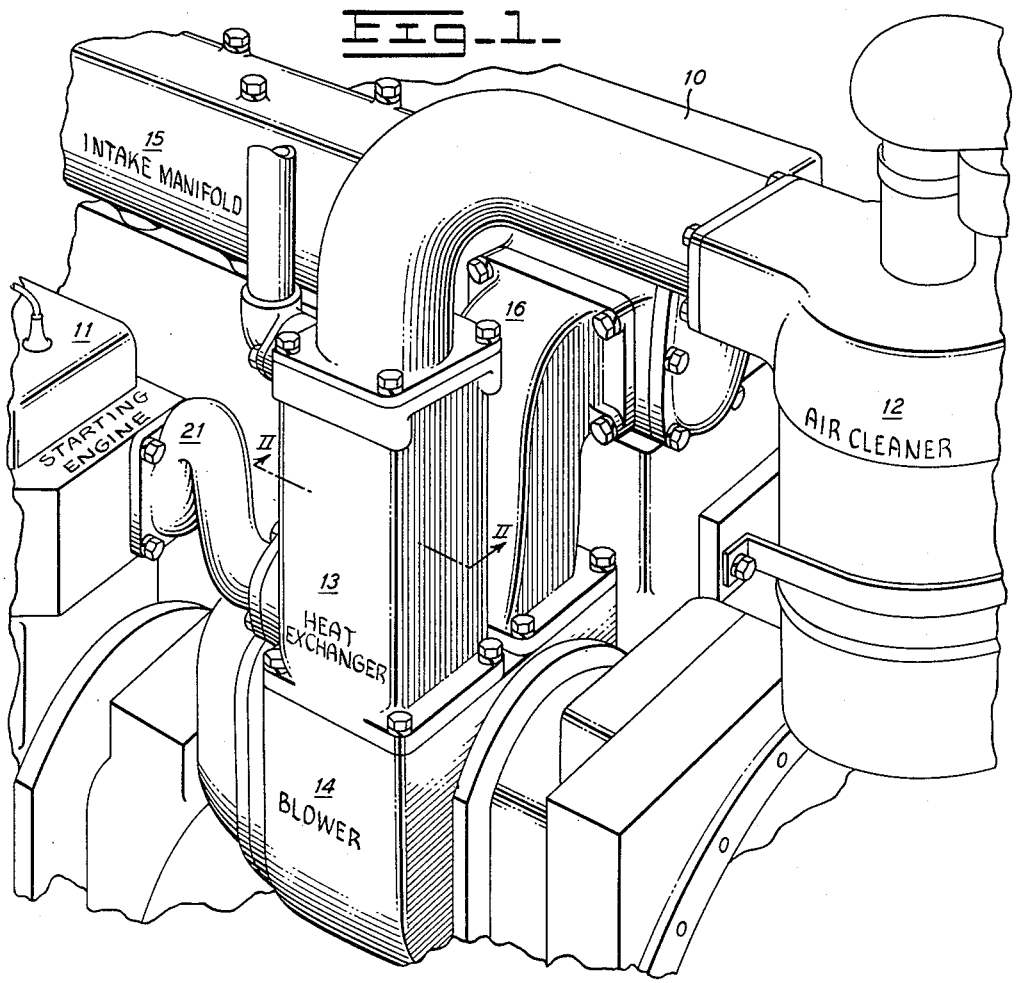
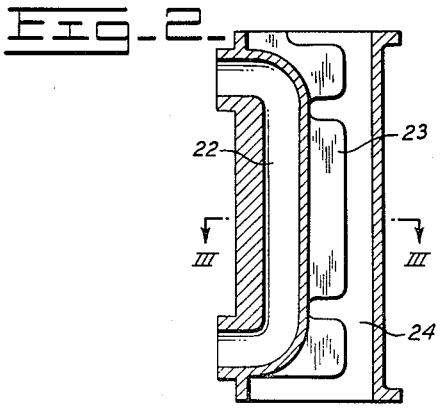
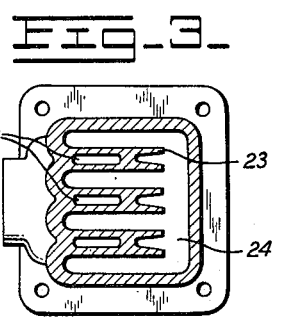
INVENTOR.
Lloyd E. Johnson
BY Charles M. Fryer
Attorney

United States Patent Office 2,764,966
Patented Oct. 2, 1956

2,764,966
STARTING SYSTEM FOR COMPRESSION IGNITION ENGINES

Lloyd E. Johnson, East Peoria, Ill., assignor to Caterpillar Tractor Co., Peoria, Ill., a corporation of California Application December 9, 1953, Serial No. 397,107

3 Claims. (Cl. 123—179)

The present invention relates to the starting of compression ignition engines and particularly to means for introducing heated air to the combustion chambers of an engine during the starting period.

It has been common practice in the past to utilize the exhaust gas of an auxiliary starting engine to heat the intake manifold of a compression ignition engine thereby facilitating the starting of the main engine during cold weather operation.

This invention is concerned with the starting of compression ignition engines at low temperature and especially engines equipped with a blower or supercharger.

It is the object of the present invention, to facilitate the starting of a compression ignition engine by the provision of a heat exchanger and a blower, arranged in series in the air induction system whereby heated air from the heat exchanger is introduced into the blower and upon compression by the blower is further heated before it passes to the engine.

In the drawing:

Figure 1 is a fragmentary perspective view of the rear portion of a compression ignition engine showing the starting engine and the air induction system of the present invention.

Figure 2 is a vertical sectional view of the heat exchanger taken on line II—II of Figure 1, and Figure 3 is a section taken on line III—III of Figure 2.

A portion of the compression ignition engine, hereinafter referred to as the main engine, is shown at 10. A conventional internal combustion engine serving as an auxiliary starting engine 11 is disposed at the side of the main engine. The starting engine is equipped with a pinion, not shown, meshing with a ring gear on the flywheel of the main engine, also not shown, to crank the main engine in a conventional manner during the starting cycle. Air is introduced into the induction system of the main engine through an air cleaner 12 passing through a heat exchanger 13, a blower 14, and thence into the intake manifold 15 by means of a connecting tube 16. During the starting cycle of the main engine, exhaust gases from the starting engine 11 are directed to the heat exchanger by means of a pipe 21. As shown in Figures 2 and 3, these exhaust gases continue through the heat exchanger by way of channels 22 having finned walls 23 which transfer heat to the air in passageways 24 which are included in the induction system of the main engine.

The usual procedure followed in starting the main engine is first to start the auxiliary engine and allow it to motor the main engine for a period of time which varies with the ambient air temperature. A longer cranking time is required during cold weather operation. Since both of these engines usually have a common water cooling system, the cylinder block of the main engine is warmed to aid in its starting. While the cylinder block of the main engine is being warmed by water in the common cooling system, the heat exchanger 13 and the blower 14 are also being heated by the exhaust gases from the starting engine.

The incoming air is first heated by the heat exchanger 13 and passes in its heated condition through the blower 14 where further heat is added by compression before it enters the intake manifold and combustion chamber of the engine.

It is known that the temperature of air passing through a blower or supercharger rises in proportion to the amount of compression occurring in the blower at a given cranking speed, and the efficiency of the particular blower. A greater temperature rise will occur as the result of compression when warm air is admitted to the blower than when cool air enters the blower. Therefore, it is advantageous to dispose the heat exchanger and the blower in series in the order named in the air induction system so that the relatively cool air is heated upon passing through the heat exchanger prior to its further heating as the result of compression by the blower.

Since compression ignition engines start most readily when warm air is introduced into the intake manifold, the arrangement disclosed herein materially aids the starting of the main engine.

After starting of the main engine, the starting engine is shut down and the heat exchanger has no adverse effect upon normal operation of the main engine.

I claim:

1. A starting system for a supercharged compression ignition engine comprising an internal combustion starting engine, a heat exchanger disposed in the air induction system of the compression ignition engine, means to direct exhaust gases of the starting engine through said heat exchanger to heat air entering said induction system, and a blower arranged to receive air from said heat exchanger and direct it to the intake manifold to compress and further heat the air from the heat exchanger to facilitate the starting of the compression ignition engine.

2. In the air induction system of a compression ignition engine, having an auxiliary internal combustion starting engine, an air intake manifold, a blower to direct air to said manifold, a heat exchanger in the path of air entering the blower, means to direct the starting engine exhaust gas through said heat exchanger to admit heated air into the blower so that the air is subsequently heated to a higher temperature upon compression thereby aiding the starting of the compression ignition engine.

3. In combination with a compression ignition engine including a starting engine and a supercharger blower for directing air into the intake manifold of the main engine, means to conduct the exhaust from the starting engine into heat exchanging relationship with air entering the blower to heat said air prior to its introduction into said blower.

References Cited in the file of this patent

UNITED STATES PATENTS 2,119,794   Rosen _____ June 7, 1938

FOREIGN PATENTS 597,815   France _____ Nov. 30, 1925